(12) United States Patent
Monti

(10) Patent No.: US 6,752,257 B2
(45) Date of Patent: Jun. 22, 2004

(54) DEVICE FOR TRANSFERRING BLISTER PACKS AND THE LIKE FROM A CUTTING STATION TO THE FEEDING LINE OF A PACKAGING MACHINE

(75) Inventor: Giuseppe Monti, Pianoro (IT)

(73) Assignee: Marchesini Group S.P.A., Bologna (IT)

( * ) Notice: Subject to any disclaimer, the term of this patent is extended or adjusted under 35 U.S.C. 154(b) by 72 days.

(21) Appl. No.: 10/288,090

(22) Filed: Nov. 5, 2002

(65) Prior Publication Data
US 2003/0085101 A1 May 8, 2003

(30) Foreign Application Priority Data
Nov. 6, 2001 (IT) .................................... BO2001A0677

(51) Int. Cl.⁷ .............................................. B65G 47/26
(52) U.S. Cl. ....................... 198/433; 198/403; 198/409; 198/377.07
(58) Field of Search ............................... 198/409, 403, 198/433, 377.07, 377.08

(56) References Cited

U.S. PATENT DOCUMENTS

| | | | | |
|---|---|---|---|---|
| 5,299,907 A | * | 4/1994 | Dal Pozzo | 414/797.8 |
| 5,681,138 A | * | 10/1997 | Lust et al. | 414/752.1 |
| 5,687,541 A | * | 11/1997 | Martin et al. | 53/54 |
| 6,012,471 A | * | 1/2000 | Calvin et al. | 134/58 R |
| 6,070,385 A | | 6/2000 | Antonio | |
| 6,206,172 B1 | * | 3/2001 | Abe | 198/403 |
| 6,283,694 B1 | * | 9/2001 | Spatafora et al. | 414/416.05 |
| 6,345,713 B1 | * | 2/2002 | Ronchi | 198/377.03 |
| 6,364,089 B1 | * | 4/2002 | Singh et al. | 198/408 |
| 6,364,090 B1 | * | 4/2002 | Wild et al. | 198/408 |
| 6,637,174 B1 | * | 10/2003 | Dietrich et al. | 53/252 |

FOREIGN PATENT DOCUMENTS

| | | |
|---|---|---|
| DE | 32 33 186 | 4/1994 |
| EP | 0 466 660 | 1/1992 |
| FR | 2692869 | 12/1993 |
| WO | WO 00 68086 | 11/2000 |

* cited by examiner

Primary Examiner—Joe Dillon, Jr.
(74) Attorney, Agent, or Firm—William J. Sapone; Coleman Sudol Sapone, P.C.

(57) ABSTRACT

A device for transferring blister packs to the feeding line of a packaging machine includes a pick-up member capable of picking-up a series of blister packs disposed in reciprocal alignment at the blister packs cutting station and releasing this series of blister packs in alignment with a conveyor situated adjacent to the cutting station. A blister packs selective releasing device is situated above the conveyor and is equipped with support elements for receiving in support the blister packs picked-up by the pick-up member and operated selectively to release the blister packs, disposed in reciprocal alignment and orderly spaced apart, onto the conveyor. A stepwise rotating carrousel is situated at the outlet of said conveyor and is equipped with gripping members capable of picking-up the blister packs from the conveyor and transferring the blister packs, one by one, to a feeding line arranged perpendicular with respect to the conveyor.

7 Claims, 1 Drawing Sheet

DEVICE FOR TRANSFERRING BLISTER PACKS AND THE LIKE FROM A CUTTING STATION TO THE FEEDING LINE OF A PACKAGING MACHINE

BACKGROUND OF THE INVENTION

The present invention relates to feeding blister packs to an automatic packaging machine.

More precisely, the invention relates to a device for transferring blister packs from the cutting station of a so-called blistering machine to the feeding line of the packaging line.

DESCRIPTION OF THE PRIOR ART

As it is known, blister packs are obtained by cutting a band, which has a plurality of blisters, suitably arranged, filled with respective products.

At each step of the blister band forward movement in the cutting station of the blistering machine, a series of blister packs are usually obtained from the blister band, which blister pack are aligned along a direction crosswise to the band longitudinal axis.

Then, the series of blister packs must be transferred to the feeding line of the packaging machine, which introduces the blister packs in suitable boxes.

According to traditional solutions, the feeding line of the packaging machine is disposed in longitudinal alignment with the outlet line of the blistering machine.

This solution can cause problems due to the resulting overall dimensions of the machine.

According to other solutions, the positioning of the packaging machine is rigid, as it is imposed by the disposition of the line connecting the packaging machine with the blistering machine.

Another reported drawback derives from the fact that during the transferring, it is not possible to maintain positive control of the position of the single transferred blister packs, e.g. to reject possible defective blister packs. It is therefore necessary provide solutions to these problems, which are otherwise complicated and expensive.

SUMMARY OF THE INVENTION

It is an object of the present invention to propose a device, which allows series of blister packs to be automatically transferred from a cutting station to a feeding line of a packaging machine situated perpendicular to the outlet line for the blister packs coming from the cutting station, while maintaining the arrangement in a line and the positive control of the blister packs being transferred.

Another object of the present invention is to propose a device, which has a constructively very simple and functional structure and which is versatile in relation to the type of blister packs to be transferred.

The above mentioned objects are obtained, in accordance with the content of the claims, by a device for transferring blister packs and the like from a cutting station to the feeding line of a packaging machine, the device including: conveyor means disposed adjacent to the cutting station for cutting blister packs;

pick-up means for picking-up a series of blister packs disposed in reciprocal alignment at said cutting station, and placing said series of blister packs in alignment with said conveyor means;

blister packs selective releasing means situated above said conveyor means and equipped with support elements designed for receiving said blister packs picked-up by said pick-up means and operated selectively to release said blister packs, disposed in reciprocal alignment and orderly spaced apart, onto said conveyor means;

a mechanism disposed at the outlet of said conveyor means and equipped with gripping means capable of picking-up said blister packs from said conveyor means and transferring said blister packs one by one to the feeding line of a packaging machine, which is disposed at a selected angle with respect to said conveyor means.

BRIEF DESCRIPTION OF THE DRAWINGS

The invention will now be described in more detail with reference to particular, non-limiting embodiments and with reference to the accompanying drawings, in which.

DESCRIPTION OF THE PREFERRED EMBODIMENT

Figure 1:
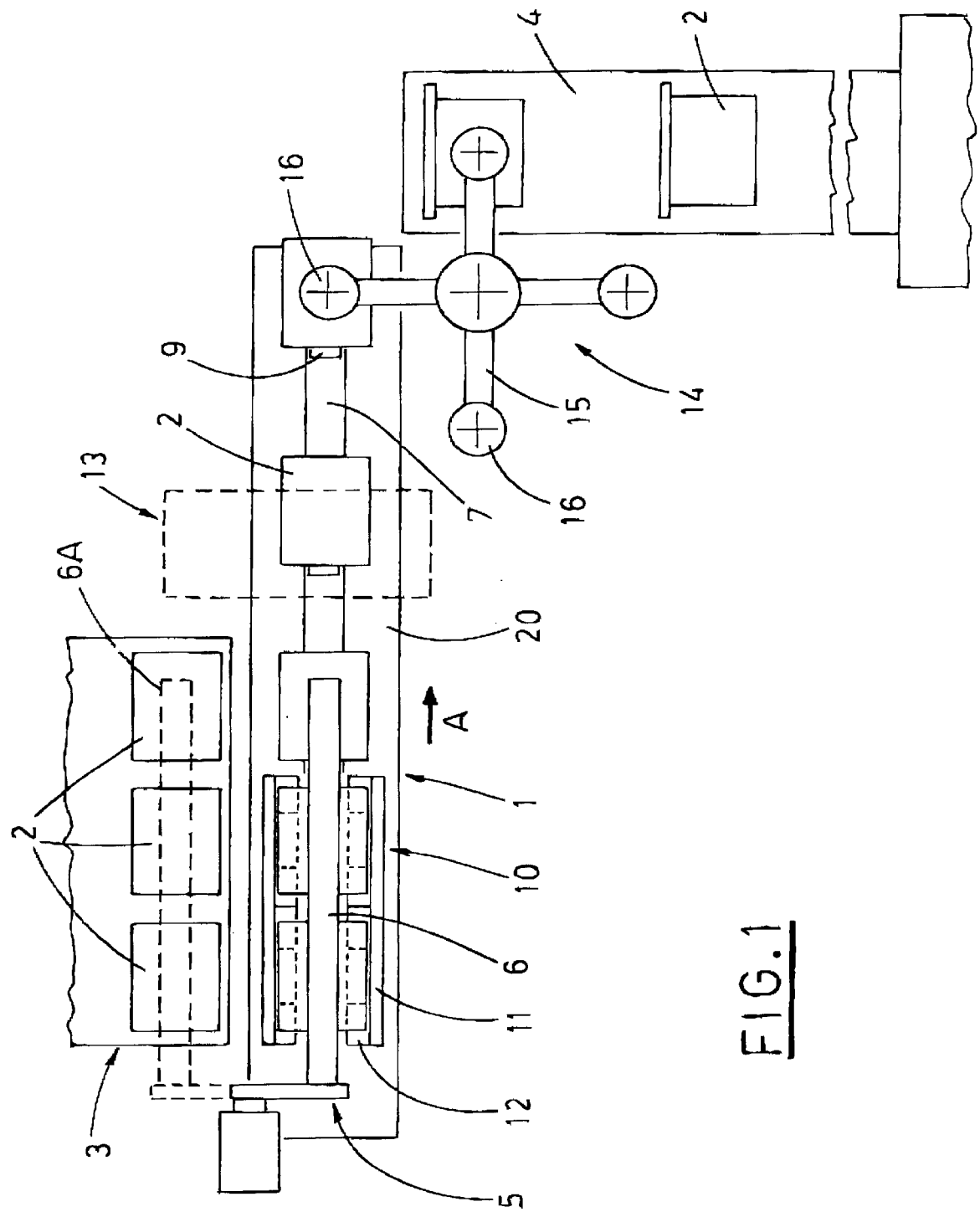
FIG. 1 shows a schematic top view of the proposed device for transferring blister packs to the feeding line of a packaging machine.

With reference to the above Figure, reference numeral 1 indicates the device for transferring blister packs 2 from a cutting station 3 of a blistering machine to a feeding line 4 of a packaging machine.

In the case illustrated herein, in the cutting station 3, a group of three blister packs 2 are cut off from a blister band at each step, and are disposed in reciprocal alignment at the outlet area of the cutting station 3.

However, it is obvious that the number of blister packs being processed can be different, in relation to the needs. The transferring device 1 includes a pick-up member 5 for picking-up blister packs 2, which is aimed at withdrawing the blister packs 2 from the outlet area of the cutting station 3 and at transferring them to adjacent belt conveyor means 7, which are operated into continuous motion in the direction indicated with the arrow A.

The conveyor belt 7 defines an active upper run extended horizontally in a direction parallel to the alignment axis of the group of blister packs 2 at the outlet of the cutting station 3.

The conveying belt 7 has a series of transversal lugs 9, regularly spaced apart, between which respective spaces are defined for receiving blister packs 2 to be transferred to the feeding line 4.

The pick-up member 5 includes an arm 6 for gripping the blister packs 2, which reciprocates between a pick-up position, in which the blister packs 2 are picked-up from the cutting station 3, indicated with broken line 6A, and a release position, in which the blister packs 2 are released onto the conveyor belt 7, disposed in aligned therewith.

A selective releasing member 10 for selective releasing of blister packs 2 is situated in the region corresponding to an area where the pick-up member 5 releases the blister packs 2, above the conveyor belt 7.

The selective releasing member 10 includes a pair of lateral plates 11 arranged longitudinally to the conveyor belt 7 for retention of the blister packs 2.

A plurality of retractable support elements 12 extend symmetrically from the plates 11 and are operated selectively by respective actuator means, e.g. pneumatic, not shown.

As explained in detail in a Patent Application of the same Applicant, the selective releasing member 10 extends longitudinally to the conveyor belt 7, so as to support the blister packs 2, released by the withdrawing member 5, disposed in a line and supported on both sides by the retractable support elements 12, excluding a first blister pack situated at a foremost position along the forward movement direction A of the conveyor belt 7.

The first blister pack falls directly onto the conveyor belt 7.

The supports elements 12 can extend longitudinally, so as to support all the blister packs released by the withdrawing member 5.

On request, one or at most two printing heads, indicated with broken line 13, e.g. ink-jet heads, can be situated downstream of the selective releasing member 10, along the forward movement direction A of the conveyor belt 7.

The blister packs 2, conveyed on the conveyor belt 7 are transferred one by one to the feeding line 4 of the packaging machine, situated perpendicular to the conveyor belt 7, on the same horizontal plane by a carrousel 14, rotating stepwise. The carrousel 14 has a plurality of radial arms 15 equipped with gripping means 16. The radial arms rotate on a vertical axis during the transferring step, so as to make the blister packs 2 counter-rotate to maintain unchanged their orientation.

The operation of the proposed device for transferring blister packs 2 to the feeding line 4 of the packaging machine includes substantially picking-up a group of blister packs 2, aligned with one another, at the cutting station 3 of the blistering machine.

The gripping arm 6 of the pick-up member 5 is translated from the position 6A, in which the blister packs 2 are picked-up, to the position, in which the blister packs 2 are released, disposed aligned with the conveyor belt 7.

The blister packs 2 picked-up by the pick-up arm 6 are the released onto the retractable support elements 12 of the selective releasing member 10, except for the first blister pack, situated in the foremost position, which falls directly onto the conveyor belt 7.

Then, in suitable time relation with the forward movement of the conveyor belt 7, other blister packs 2, reciprocally aligned and orderly spaced apart, are released onto the conveyor belt 7, each one into a respective space defined between a pair of subsequent transversal lugs 9 of the conveyor belt 7.

Otherwise, as already mentioned, the support elements 12 can extend longitudinally, so as to receive also the first blister pack; the first, second and third blister packs are released onto the conveyor belt 7, situated below, by corresponding selective operation of the support elements 12.

In the outlet area of the conveyor belt 7, the blister packs 2 are picked-up one by one by the gripping means 16 of the carrousel 14 and transferred to the feeding line 4 of the packaging machine, situated perpendicular to the conveyor belt 7.

The rotation by 90° of the gripping means 16 during the transferring step, in the direction opposite to the rotation direction of the carrousel 14, makes the blister packs 2 counter-rotate, which allows the original orientation of the blister packs 2 to be maintained unchanged on the feeding line 4.

Therefore, the proposed device fulfills the object to transfer blister packs automatically in series from the cutting station of the blistering machine to a feeding line of the packaging machine, situated perpendicular, maintaining the arrangement in line and the positive control of the transferred blister packs.

In the example illustrated herein, the feeding line 4 is perpendicular to the conveyor belt 7; it is understood that the angle between the line 4 and the belt 7 can be different than 90°.

The angular arrangement, advantageously at 90°, of the belt 7 and the line 4, allows the operator to position the packaging machine in most suitable way, with consequent optimizing of the spaces.

Summarizing, according to the prior art, the belt 7 and the line 4 are either aligned or arranged along an unavoidably predetermined path, which is an evident limitation for the positioning of the packaging machine with respect to the blistering machine.

The proposed solution overcomes this limitation and brings about all the consequent advantages.

What is claimed is:

1. A device for transferring blister packs and the like from a cutting station, for cutting blister packs in a blistering machine, to a feeding line of a packaging machine, the device including:

conveyor means disposed adjacent to said cutting station;

pick-up means for picking-up a series of blister packs, disposed in reciprocal alignment at said cutting station, and placing said series of blister packs in alignment with said conveyor means;

selective releasing means for selectively releasing blister packs, said selective releasing means being situated above said conveyor means and equipped with support elements designed for receiving said blister packs, picked-up by said pick-up means, and operated selectively to release said blister packs, disposed in reciprocal alignment and orderly spaced apart, onto said conveyor means;

a mechanism disposed at the outlet of said conveyor means and equipped with gripping means capable of picking-up said blister packs from said conveyor means and transferring said blister packs one by one to the feeding line of a packaging machine, which is disposed at a selected angle with respect to said conveyor means.

2. A device according to claim 1, wherein said feeding line is arranged perpendicular with respect to said conveyor means.

3. A device according to claim 1, wherein said conveyor means include a series of transverse lugs set regularly spaced apart, among which respective spaces are defined for receiving respective blister packs released by said selective releasing means.

4. A device according to claim 1, wherein said pick-up means include a blister packs gripping arm reciprocating between a pick-up position, in which it picks-up blister packs from said cutting station, and a release position, in which it releases said blister packs onto said conveyor means in alignment therewith.

5. A device according to claim 1, further including a printing head situated downstream of said selective releasing means, considering a forward movement of said conveyor means, said printing head being provided for printing on said blister packs while advancing along said conveyor means arranged in a line.

6. A device according to claim 1, wherein said gripping means can rotate about a vertical axis so as to cause said blister packs to counter-rotate while being transferred so as to maintain unchanged the orientation of the same blister packs transferred onto the feeding line.

7. A device according to claim 6, wherein the counter-rotation movement of said gripping means extends through an angle of 90°.

* * * * *